INVENTOR
William T. Hage
BY
ATTORNEY

INVENTOR
William T. Hage
BY
J. R. Moran
ATTORNEY

United States Patent Office 2,730,560
Patented Jan. 10, 1956

2,730,560

TAPPING CONTROL SYSTEM FOR MELTING FURNACES

William T. Hage, Alliance, Ohio, assignor to The Babcock & Wilcox Company, New York, N. Y., a corporation of New Jersey Application August 28, 1952, Serial No. 306,772

11 Claims. (Cl. 13—33)

This invention relates to control systems for material melting furnaces and, more particularly, to a novel system controlling at least a portion of the heat input to a melting furnace in accordance with the energy level, such as radiation or luminous intensity, of molten material discharged or tapped from the furnace.

The invention control system is particularly designed for use in the melting of refractory material, such as, for example, kaolin and molybdenum. In the manufacture of refractory wool for insulation purposes, charges of the refractory material, such as kaolin, are substantially continuously fed into a melting furnace of the electric arc or resistance type, and molten material is continuously withdrawn through a bottom tap. This molten material is then blown or otherwise treated to form refractory wool.

Many problems are encountered in the practical operation of this process. For example, when the melting furnace is started, there is some delay before a pool of molten material is produced adjacent the tap hole or nozzle. Consequently, withdrawal of molten material through the nozzle is initiated only some time after the melting operation has started. Due to the very high temperature of the molten refractory material, which is of the order of substantially in excess of 3000° F., particular care must be given to the tapping nozzle as to its material, location, and cooling arrangements.

The tapping nozzle must be of a material that will withstand, when properly cooled, the high temperatures present in the body of molten refractory. Basically, the problem is one of heat transfer in that if the temperature of the tapping nozzle can be controlled, the tapping rate of the molten refractory and the rate of wear in the nozzle can be controlled.

In accordance with the present invention, it has been found that such control can be effected by supplying sufficient coolant to the nozzle to maintain it at a temperature below the melting temperature of the refractory material, and then applying sufficient auxiliary heat to the nozzle to bring the temperature to a value at which molten material will flow therethrough, without freezing, at a desired rate. In the present case, this is effected by measuring the relative temperature, or energy level, of the molten material tapped from the nozzle, comparing the measured value with a pre-set value, and utilizing any differential between the values to control the amount of heat provided by the auxiliary heating means for the nozzle. More specifically, an auxiliary electrode may be disposed in the furnace in arcing relation to the metallic nozzle, the nozzle and the auxiliary electrode being connected to a source of potential with the supply of power thereto being regulated by the invention control system.

To the accomplishment of this result, the invention control system includes an energy level sensitive element, such as a photocell or thermocouple arranged adjacent the path of the molten material or drops tapped from the melting furnace, and having an output or signal potential substantially instantaneously responsive and proportional to the radiant energy or luminosity of the successive molten droplets. The D. C. signal from the radiant energy sensitive element is converted to an amplified A. C. signal which is fed to a phase discriminating circuit and applied to drive a tap rate recorder. The amplified signal is compared, as to potential, with an accurately pre-set and controlled comparison potential corresponding to the desired relative tap rate or energy level of the molten droplets.

The resultant of the measured, or amplified signal, potential and the comparison potential is converted to an amplified A. C. control potential which is used to correspondingly control the D. C. current flow through the control coil of a saturable reactor. The power coil of this saturable reactor is connected in the A. C. grid supply circuit of a full wave rectifier controlling the D. C. energization of the control coil of a second reactor.

The degree of saturation of the first reactor, which is a function of the D. C. energization of its control coil, determines the effective inductance of its power coil. This inducance in the grid supply circuit of the rectifier varies the phase thereof relative to that of the anode supply circuit. Such phase shift in turn determines the time period of the unidirectional output from the rectifier, and thus the effective D. C. energization of the control coil of the second or power control reactor.

The power coil of the power control reactor is connected in the supply circuit for electrically energized auxiliary heating means for the tapping nozzle. The D. C. energization of the control coil of the second reactor controls the effective inductance of its power coil. Thus, the power supplied to the nozzle heating means is varied in proportion to the differential between the pre-set value of the radiant energy level in the molten droplets and the measured value thereof, to maintain the radiant energy substantially uniform.

For an understanding of the invention principles, reference is made to the following description of a typical embodiment thereof as illustrated in the accompanying drawings. In the drawings.

Figure 1:
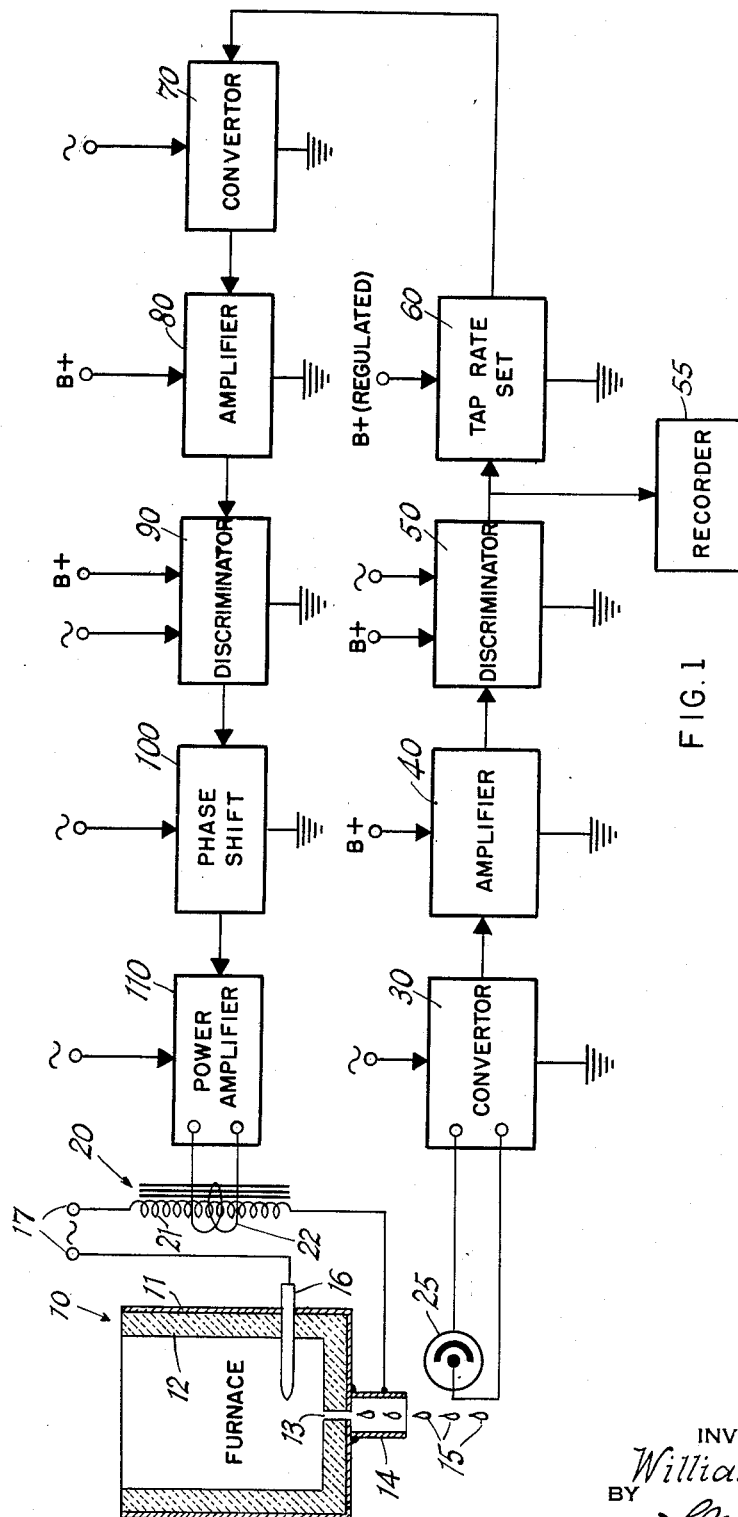
Fig. 1 is a block diagram of the invention control system.

Referring to Fig. 1, a melting furnace 10 for refractory materials is illustrated as including a metallic casing 11 having a refractory lining 12. Furnace 10 is provided with a bottom tap hole 13 leading to a metallic discharge nozzle 14 which may be lined if necessary. Furnace 10 may be an electric arc or a resistance furnace, the principal heating means for the furnace not being illustrated because it is conventional and is not part of the invention claimed.

Refractory material charged into furnace 10 is melted by the heating means thereof, and the molten refractory material is tapped out through hole 13 and nozzle 14, appearing as a series or stream of molten droplets 15. The cooling and adjustment means for nozzle 14 are not illustrated as they form no part of the invention control system.

The auxiliary heating means for maintaining a uniform pre-selected temperature at the nozzle includes an auxiliary electrode 16 extended into the furnace and into operative relation with nozzles 14 to provide a current flow between the nozzle and electrode 16 through the molten material adjacent the nozzle. Nozzle 14 and electrode 16 are connected in an energizing circuit supplied with power from a transformer 18 (Fig. 2) energized from an A. C. source connected to terminal 17. For a purpose to be described, the power coil 21 of a saturable reactor 20 is connected in series in the transformer energizing or supply circuit.

The energy level of molten refractory drops 15, as indicated, for example, by their luminous intensity, is measured by an energy level sensitive device such as a photocell 25 disposed adjacent the discharge or flow path of drops 15. The D. C. output or signal potential from photocell 25, which is a function of the luminous intensity of drops 15, is converted to a corresponding magnitude A. C. potential by a converter 30. The A. C. signal potential is amplified in a multi-stage amplifier 40 and the rectified and amplified signal potential fed to a phase discriminator 50 whose output drives a tap rate recorder 55.

The amplified measured signal potential is also applied to a tap rate set arrangement 60 where it is balanced against an accurately maintained, pre-settable potential corresponding to the desired or optimum tap rate or nozzle temperature. The resultant of these two potentials is converted to a corresponding A. C. potential in convertor 70, amplified in a multi-stage amplifier 80, and fed to a phase discriminator 90.

In the phase discriminator 90, the amplified and rectified differential between the measured and pre-set potentials is used to control the saturation of the D. C. control coil of a first saturable reactor included in a phase shift arrangement 100. This first saturable reactor controls the phase of the grid potential, relative to the anode potential, of a full wave rectifier and power supply arrangement 110 which supplies the D. C. energization of the control coil 22 of saturable reactor 20.

This control coil controls the saturation of reactor 20, and thus the effective inductance of power coil 21. As the latter is connected in the auxiliary heating supply circuit, the auxiliary heating is thus varied in accordance with any variation of the measured energy level of drops 15 from the pre-set value thereof.

Figure 2:
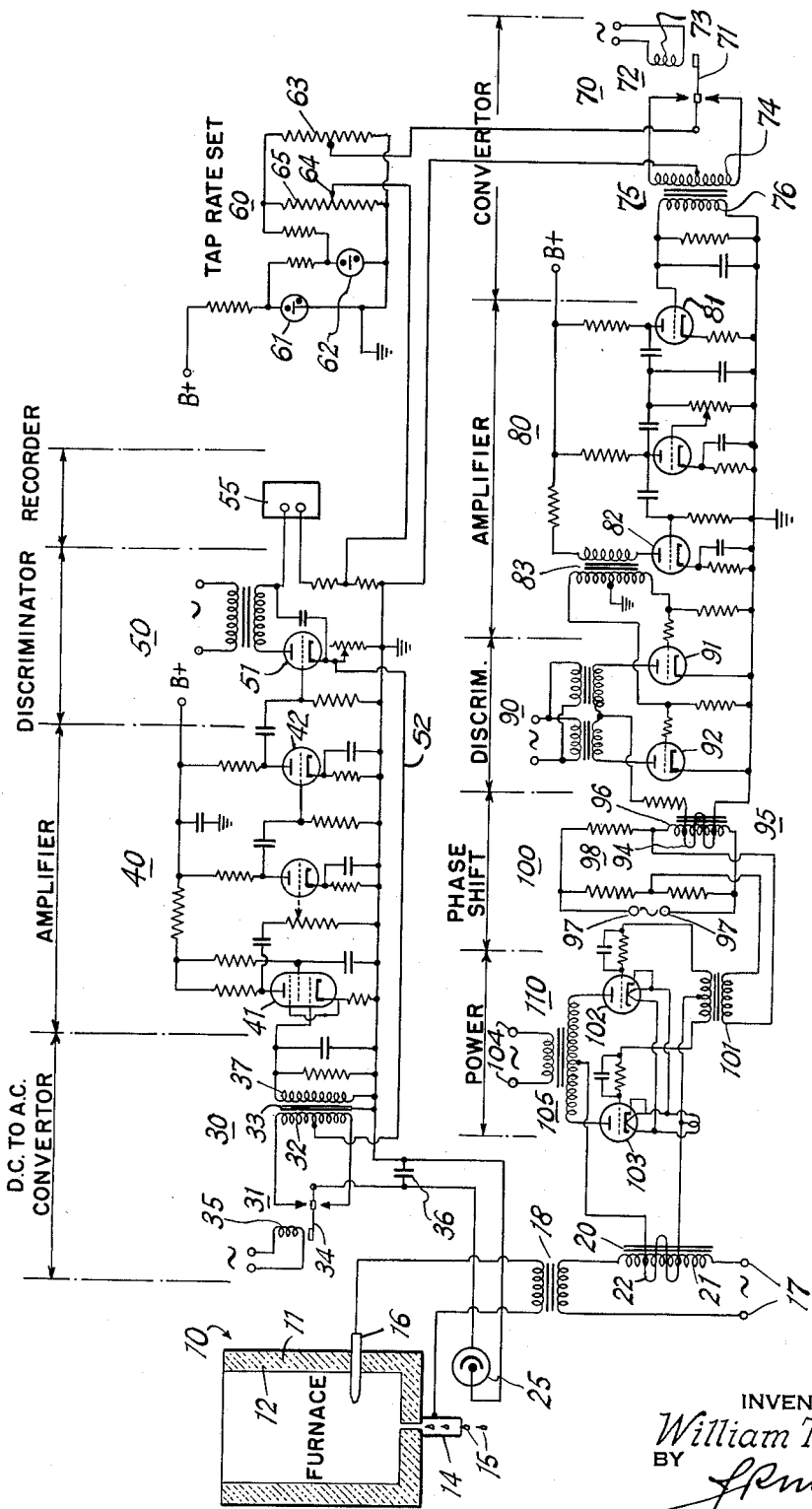
Fig. 2 is a schematic wiring diagram thereof.

Referring to Fig. 2, the convertor 30 includes a chopper 31 having its contacts connected to opposite ends of primary winding 32 of transformer 33. The chopper armature 34 is connected to one terminal of photocell 25, the other photocell terminal being grounded. Chopper coil 35 is A. C. energized. A condenser 36 blocks A. C. from the photocell.

The secondary winding 37 of transformer 33 is capacitance coupled to the first stage 41 of amplifier 40, and the third and last stage 42 of this amplifier is capacitance coupled to the grid of a rectifier 51 in phase discriminator 50. The cathode of tube 51 is tied to the mid point of transformer primary winding 32 by a conductor 52. Sections 30, 40 and 50 have the primary function of driving recorder 55, for recording the tap rate.

Tap rate set arrangement 60 includes a pair of voltage regulating tubes 61, 62 by means of which an accurately regulated and stabilized B+ potential is applied across a potentiometer 65 connected in parallel with a resistor 63. The effective value of the signal potential applied to control the auxiliary heating is set by adjustment of contact 64.

A center tap on resistor 63 is used to apply the differential of the measured and pre-set potentials to the armature 71 of a chopper 72 forming part of convertor 70. The contacts of chopper 72 are connected to opposite ends of primary winding 74 of a transformer 75, this winding having its center tap connected to the cathode of tube 51. An A. C. energized coil 73 operates chopper armature 71. Secondary winding 76 of transformer 75 is capacity coupled to the first stage 81 of amplifier 80.

The third and last amplifier stage 82 is coupled by transformer 83 to the control grids of tubes 91, 92 incorporated in phase discriminator 90. These tubes supply the D. C. energization of the control coil 94 of a saturable reactor 95, the energization of the control coil being dependent on the potential applied to the control grids and thus upon the differential between the measured temperature of drops 15 and the pre-selected optimum temperature thereof.

The power coil 96 of reactor 95 has an A. C. potential applied thereto from terminals 97 through a bridge network 98. The effective value of the inductance of coil 96 depends upon the saturation of reactor 95 which, in turn, is dependent upon the D. C. current through control coil 94. Through a transformer 101, bridge network 98 is connected to the grids of tubes 102, 103 included in power amplifier 110. Plate potential for these tubes is supplied from terminals 104 through a transformer 105. The control coil 22 of power supply reactor 20 is connected in the output circuit of tubes 102, 103.

Variations in the inductance of power coil 96 of reactor 95 vary the phase of the grid potentials of tubes 102, 103 relative to the plate potential thereof. The phase relation of the grid and plate potentials controls the flow of direct current through control coil 22 of reactor 20 by controlling the proportion of each cycle during which tubes 102, 103 are conductive. The amount of current flow through coil 22 determines the saturation of reactor 20 and thus the effective inductance of its power coil 21. This, in turn, controls the power flow to the auxiliary heating arrangement for nozzle 14.

The circuit may be made responsive to either the instantaneous luminosity of each drop 15 or to the integrated value of the series of drops, by proper selection of the phototube 25 as to its response. For example, an infrared responsive phototube may be used. If desired, a radiation responsive thermocouple may be substituted for the photocell.

While a specific embodiment of the invention has been shown and described in detail to illustrate the application of the invention principles, it will be understood that the invention may be embodied otherwise without departing from such principles.

What is claimed is:

1. In combination, a melting furnace having an outlet for discharge of molten material; auxiliary heating means in said furnace adjacent said outlet; a source of energy for said heating means; and means, including a phototube disposed adjacent the path of molten material discharging from the furnace, controlling the supply of energy to said auxiliary heating means in inverse relation to the luminous intensity of such discharging molten material.

2. In combination, a melting furnace having an outlet for discharge of molten material; electrically energized auxiliary heating means in said furnace adjacent said outlet; a source of electrical energy for said heating means; and means, including a phototube disposed adjacent the path of molten material discharging from the furnace, controlling the supply of energy to said auxiliary heating means in inverse relation to the luminous intensity of such discharging molten material.

3. In combination, a melting furnace having an outlet for discharge of molten material; electrically energized heating means in said furnace; a source of electrical energy for said heating means; a saturable reactor having its power coil connected between said source and said heating means; and means, including the control coil of said reactor and a phototube operatively associated with said control coil and disposed adjacent the path of molten material discharging from the furnace, controlling the supply of energy to said heating means in inverse relation to the energy level of such discharging molten material.

4. In combination, a melting furnace having an outlet for discharge of molten material; electrically energized auxiliary heating means in said furnace adjacent said outlet; a source of electrical energy for said heating means; a saturable reactor having its power coil connected between said source and said heating means; and means, including the control coil of said reactor and a phototube operatively associated with said control coil and disposed adjacent the path of molten material discharging from the furnace, controlling the supply of energy to said auxiliary heating means in inverse relation to the energy level of such discharging molten material.

5. In combination, a melting furnace having an outlet for discharge of droplets of molten material; electrically energized heating means in said furnace adjacent said outlet; a source of electrical energy for said heating means; a saturable reactor having its power coil connected between said source and said heating means; and means, including the control coil of said reactor and a phototube operatively associated with said control coil and disposed adjacent the path of the droplets of molten material discharging from the furnace, controlling the supply of energy to said auxiliary heating means in inverse relation to the luminous intensity of the individual droplets.

6. In combination, a melting furnace having an outlet for discharge of molten material; electrically energized heating means in said furnace; a source of electrical energy for said heating means; means including a radiant energy sensitive device disposed adjacent the path of molten material discharging from the furnace, providing a signal proportional to the actual radiant energy level of the discharging molten material; pre-settable means providing a signal proportional to the desired radiant energy level of the discharging molten material; current control means connected between said source and said heating means; and means, including circuit connections between said measuring means, said pre-settable means and said control means, modulating the current flow to said heating means in accordance with the differential of said signals.

7. In combination, a melting furnace having an outlet for discharge of molten material; electrically energized auxiliary heating means in said furnace adjacent said outlet; a source of electrical energy for said heating means; means including a radiant energy sensitive device disposed adjacent the path of molten material discharging from the furnace, providing a signal proportional to the actual radiant energy level of the discharging molten material; pre-settable means providing a signal proportional to the desired radiant energy level of the discharging molten material; current control means connected between said source and said heating means; and means, including circuit connections between said measuring means, said pre-settable means and said control means, modulating the current flow to said heating means in accordance with the differential of said signals.

8. The combination claimed in claim 7 in which said device comprises a phototube.

9. The combination claimed in claim 7 in which said device comprises an infra-red responsive phototube.

10. The combination claimed in claim 7 in which said control means comprises a saturable reactor having its power coil connected between said source and said heating means and its control coil in circuit connection with said measuring means and said pre-settable means.

11. The combination claimed in claim 7 in which said control means comprises a saturable reactor having its power coil connected between said source and said heating means and its control coil in circuit connection with said measuring means and said pre-settable means; said circuit connections including phase shifting means controlling flow of current through the reactor control coil.

References Cited in the file of this patent

UNITED STATES PATENTS

| Number | Name | Date |
|---|---|---|
| 686,836 | Ruthenburg | Nov. 19, 1901 |
| 848,422 | Wynne | Mar. 26, 1907 |
| 940,561 | Seward | Nov. 16, 1909 |
| 1,248,444 | Brace | Dec. 4, 1917 |
| 1,338,881 | Stock | May 4, 1920 |
| 1,683,856 | Baily | Sept. 11, 1928 |
| 1,928,288 | Henry | Sept. 26, 1933 |
| 1,968,576 | Suits | July 31, 1934 |
| 2,133,235 | Slayter | Oct. 11, 1938 |
| 2,186,718 | Ferguson | Jan. 9, 1940 |
| 2,215,982 | Slayter et al. | Sept. 24, 1940 |
| 2,229,489 | Barnard | Jan. 21, 1941 |
| 2,244,267 | Slayter et al. | June 3, 1941 |